United States Patent
Geiger et al.

(10) Patent No.: US 7,023,318 B1
(45) Date of Patent: Apr. 4, 2006

(54) LOCKING SYSTEM, ESPECIALLY FOR MOTOR VEHICLES

(75) Inventors: August Geiger, Talheim (DE); Karl Müller, Rottweil-Neufra (DE); Michael Geber, Bad Urach (DE); Hartmut Fitz, Urbach (DE)

(73) Assignee: Marquardt GmbH, Reitheim-Weilheim (DE)

( * ) Notice: Subject to any disclaimer, the term of this patent is extended or adjusted under 35 U.S.C. 154(b) by 0 days.

(21) Appl. No.: 09/856,916

(22) PCT Filed: Nov. 29, 1999

(86) PCT No.: PCT/DE99/03773

§ 371 (c)(1),
(2), (4) Date: May 30, 2001

(87) PCT Pub. No.: WO00/32452

PCT Pub. Date: Jun. 8, 2000

(30) Foreign Application Priority Data

Dec. 1, 1998 (DE) ................................. 198 55 342

(51) Int. Cl.
*H04B 3/00* (2006.01)
*B60R 25/06* (2006.01)

(52) U.S. Cl. ..................... 340/5.31; 340/5.7; 70/249
(58) Field of Classification Search ............... 70/186, 70/249, 256, 279; 29/825; 307/10.5; 340/5.31, 340/5.7, 5.72
See application file for complete search history.

(56) References Cited

U.S. PATENT DOCUMENTS

| | | | | |
|---|---|---|---|---|
| 4,837,567 A | | 6/1989 | Kleefeldt et al. ...... | 340/825.31 |
| 5,255,547 A | | 10/1993 | Burr et al. ................ | 70/252 |
| 5,974,661 A | * | 11/1999 | Neuhalfen .................... | 29/825 |
| 6,003,349 A | * | 12/1999 | Nagae et al. ................ | 70/186 |
| 6,389,856 B1 | * | 5/2002 | Watanuki et al. ............. | 70/186 |

FOREIGN PATENT DOCUMENTS

| | | |
|---|---|---|
| DE | 43 14 854 A1 | 11/1994 |
| DE | 43 40 260 A1 | 4/1995 |
| DE | 195 20 211 A1 | 2/1996 |
| DE | 197 29 402 A1 | 2/1999 |
| EP | 0 464 278 A1 | 1/1992 |
| EP | 0 789 120 A1 | 8/1997 |
| EP | 0 818 596 A2 | 1/1998 |
| GB | 2 169 651 A | 1/1986 |
| WO | WO 95/09746 | 4/1995 |

* cited by examiner

*Primary Examiner*—Michael Horabik
*Assistant Examiner*—Kimberly Jenkins
(74) *Attorney, Agent, or Firm*—Morgan, Lewis & Bockius LLP (57) ABSTRACT

The invention relates to an electronic lock for a locking system, in particular an electronic ignition lock for a motor vehicle. The lock has a holder into which an associated electronic key can be introduced. The key, which is in the holder, exchanges at least one coded operating signal with the lock. After positively evaluating the operating signal, the holder can be moved into at least one actuating position. The lock has a blocking element which adjusts on introduction of the key into the holder and/or removal of the key from the holder. Movement of the holder is possible when the key is correctly in the holder. Furthermore, the lock has a switching element on which the adjusting movement of the blocking element exerts a switching action via a separate transmitter which can be brought into operative connection both with the blocking element and with the switching element.

9 Claims, 8 Drawing Sheets

LOCKING SYSTEM, ESPECIALLY FOR MOTOR VEHICLES

BACKGROUND OF THE INVENTION

The invention relates to an electronic lock in accordance with the preamble of patent claim 1.

An electronic lock of this type is used in motor vehicles as an electronic ignition lock for operating an associated operating unit, such as an engine controlling means, an immobilizer or the like.

WO 95/09746 discloses a locking system for a motor vehicle, which comprises an electronic lock and an associated electronic key. The lock has a holder into which the key can be introduced. Situated in the lock is a switching element (merely indicated schematically) which can be actuated by the movement of the key as it is being introduced into the holder. The actuation of the switching element, whose switching signal can be interpreted as a "key inserted" signal, then switches on the normal operation of key and lock, the key in the holder exchanging at least one coding operating signal with the lock. After positive evaluation of the transmitted operating signal, i.e. if the key is the authorized one, release of the lock for movement of the holder by means of the key into at least one actuating position can be triggered. Starting up of the operating unit then takes place in the actuating position.

For security reasons, normal operation of key and lock has to be error-free. For this purpose, it is necessary to ensure that actuation of the switching element on introduction of the key into the holder is not error-prone. An idea to this effect cannot be inferred from WO 95/09746, since the switching element there can only be seen purely schematically.

Furthermore, it has turned out that operating states of the lock may occur in which the lock is released although the key has not been introduced, or not introduced completely, into the holder. In such an operating state it is possible for the holder to be moved into the actuation position. Manipulation of the switching element, and therefore of the "key inserted" signal, is not ruled out, in particular on removal of the key from the holder. As is immediately apparent, the security against theft is reduced as a result.

EP-A1-0 464 278 describes a lock which has a rotor which can be locked by means of magnetic tappets as tumblers. A key can be introduced into a holder of the rotor, the bit of the key being provided with a plurality of magnetic elements. If the key is the one associated with the lock, the magnetic elements correspond to the tappets, with the result that the effect of the magnetic force causes the tappets to be adjusted in order to release the movement of the rotor. At the same time, the tappets, as they are being adjusted, directly actuate associated switching elements which in turn enable an electric circuit in the motor vehicle.

Although the tumblers in this lock are moved magnetically, the lock otherwise functions essentially in the manner of a conventional, mechanical lock. The security of an electronic lock, in which a coded operating signal is exchanged with the key to bring about the release, is therefore not achieved here. Furthermore, it is disadvantageous that the magnetic tappet acts directly on the switching element. This firstly restricts the options for arranging the switching element in the lock. Secondly, the security against the switching element being manipulated is likewise not ensured. Consequently, EP-A1-0 464 278 does not impart more extensive ideas for the configuration of an electronic lock.

SUMMARY OF THE INVENTION

Taking WO 95/09746 as the starting point, the invention is based on the object of providing the lock with a means of actuating the switching element which is secure and is not prone to error.

This object is achieved in a generic electronic lock by means of the defining features of claim 1.

The lock has a further blocking element which executes an adjusting movement on introduction of the key into the holder and/or removal of the key. In the process, the blocking element interacts with the holder in such a manner that the movement of the holder additionally to its release is made possible only when the key is correctly in the holder. A transmitting means, which is separate with regard to the blocking element, for the adjusting movement of the blocking element can be brought into operative connection with the blocking element at one end and with the switching element at the other end. The adjusting movement of the blocking element causes the transmitting means to exert a switching action on the switching element. Further refinements of the invention are the subject matter of the subclaims.

The blocking element can be designed in the manner of a mechanical blocking slide. This blocking slide is mounted movably on the holder and/or in the immediate vicinity of the holder and can be brought by means of the key into or out of operative connection with a groove in the housing of the lock for additional blocking or release of the movement of the holder. The design of the blocking slide as a spring-loaded, opposed pair of slides is preferred, ensuring, as a result, that the blocking slide exerts an essentially symmetrical force. Also, a further, additional blocking slide can be in operative connection with the electronic key in the actuation position of the holder in such a manner that removal of the key from the holder is prevented.

Provision is made to subject the blocking element to a spring force in the direction of the groove in the housing of the lock. As a result, when the key is outside the holder or when it is not correctly in the holder, the blocking element protrudes into the groove in order to block the movement of the holder. If, on the other hand, the key is correctly in the holder, the blocking element is secured outside the groove by the key, resulting in this blocking of the movement of the holder being canceled. An extension on the housing of the key is expediently used in order to bring about the adjusting movement and/or the securing of the blocking element.

In a development of the invention, the transmitting means comprises a lever which is arranged between the blocking element and the switching element.

The blocking element acts on one end of the lever, to be precise preferably by means of a cam, with the result that the lever can be moved by the adjusting movement of the blocking element. For this purpose, the groove within the housing in the lock is expediently configured in the region of the cam as an opening, with the result that one end of the lever protrudes into the groove on that side of the groove which lies opposite the blocking element. The other end of the lever acts on the actuating member of the switching element, with the result that during the adjusting movement of the blocking element the lever moves the actuating member in order to exert a switching action on the switching element.

In a further refinement, the switching element comprises an electric switch, to be precise in particular a push-button switch which is designed in the manner of a break contact element. The switching element can be provided with a fully enclosed housing enabling the lock to be highly reliable, even under severe operating conditions. Depending on requirements, the switching element may be fastened on a printed circuit board arranged at a distance from the holder. The switching element is expediently designed in the manner of an SMD (surface mounted device) component, with the result that the switching element can be fastened by its connections on the printed circuit board using SMD technology.

In one development, which permits operation as in the case of a conventional ignition lock, the holder is configured as an element which can be moved rotationally and/or translationally by means of the key. This element is preferably a rotatable rotor, it being possible for a rotary catch to be brought into and out of interaction with the rotor in order to block or release the rotor. The released rotor, on rotation into the actuating position, interacts with further switching elements, which are in the immediate vicinity of the rotor, in the manner of a load-break switch. The blocking element for the additional blocking or release of the movement of the rotor is then mounted movably on and/or in the rotor.

The advantages which are obtained by the invention reside, in particular, in the fact that the functional reliability and security against theft for the motor vehicle using a lock according to the invention is [sic] increased. In particular, the manipulation of the switching element, and therefore also of the "key inserted" signal, on removal of the key from the holder is made more difficult. The arrangement for the actuation of the switching element is not prone to error. A more reliable resetting of the switching elements on removal of the key from the holder is obtained compared to previous ignition locks, thereby also ensuring reliable triggering of the steering wheel locking arrangement. An SMD key having an enclosed switching system can be used as the switching element. There is then no risk of a damaging ingress of foreign bodies into the switching element, even under severe operating conditions. The arrangement according to the invention is very fail-safe and, in addition, can be realized simply and cost-effectively.

BRIEF DESCRIPTION OF THE DRAWINGS

An exemplary embodiment of the invention together with various developments is illustrated in the drawings and is described in greater detail in the following. In the drawings

DETAILED DESCRIPTION OF THE PREFERRED EMBODIMENTS

Figure 1:
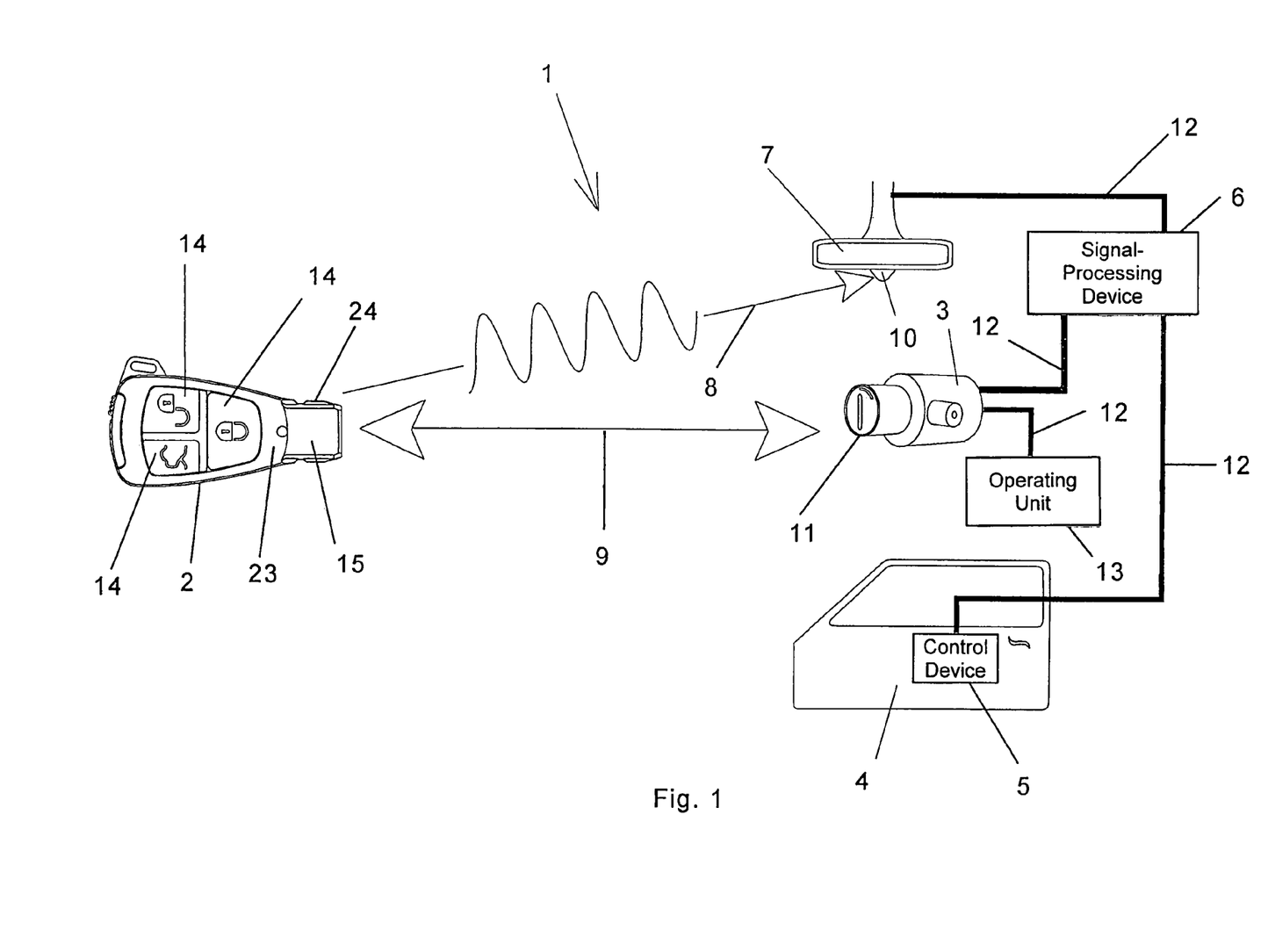
FIG. 1 shows, schematically, a functional overall view of a locking system in a motor vehicle.

In FIG. 1, a locking system 1 which is intended for a motor vehicle is shown schematically in accordance with some of its functions. The locking system 1 comprises an electronic lock 3, to be precise an electronic ignition lock and an associated electronic key 2. The lock 3 is connected to an associated operating unit 13, for example an engine controlling means, an electronic immobilizer or the like of the motor vehicle, via a bus system 12, such as the known CAN bus.

In order to start up the motor vehicle, for example to start the engine of the motor vehicle, the key 2 is introduced by its front part 15 into a holder 11 of the blocked lock 3. This movement for introducing the key 2 is transmitted to a switching element 16 which is situated in the lock 3 and can be seen in FIG. 3, with the result that the switching element 16 is actuated and produces a signal. This switching element 16 is the so-called "key inserted" switch which is actuated by the introduction of the key 2 into the holder 11 and in the process produces the so-called "key inserted" signal. The "key inserted" signal has the effect that the lock 3 passes over into a standby state, and switches on an inductive transfer of energy from the lock 3 to the key 2, with the result that the energy required for normal operation of the key 2 is supplied by the lock 3.

In the standby state of the lock 3 the key 2, which is in the holder 11, then exchanges at least one coded operating signal 9 with the lock 3, it being possible, for example, for said signal to involve infrared signals. A bidirectional code transfer between the key 2 and the lock 3 preferably takes place here. After positive evaluation of the transmitted operating signal 9 the release for the lock 3 can be triggered. When the lock 3, which is in a starting position, is blocked, it is only possible for the key 2 to be introduced into the holder 11, whereas when the lock 3 is released a further movement of the key 2 in the lock 3 is made possible. The operating unit 13 can be put into operation via the lock 3 by the holder 11 being moved by means of the key 2 into at least one actuating position, to be precise preferably by it being rotated from the starting position of the lock 3 through a certain angle into the actuating position.

In order to end the operation of the operating unit 13, for example in order to turn the engine of the motor vehicle off, the key 2 is moved back again from the actuating position into the starting position of the lock 3 and after that the key 2 is generally removed from the holder 11. Once the starting position is reached, the blocking of the lock 3 for the further movement of the key 2 in the lock 3 can be triggered. If appropriate, it is possible for the blocking to be triggered only by means of the missing "key inserted" signal on removal of the key 2 from the lock 3. Furthermore, in order to save energy the lock 3 is transferred from the standby state into a sleep state with restricted functionality and reduced consumption of power. Starting up of the vehicle again proceeds by inserting the key 2 into the lock 3, as described above.

Figure 2:
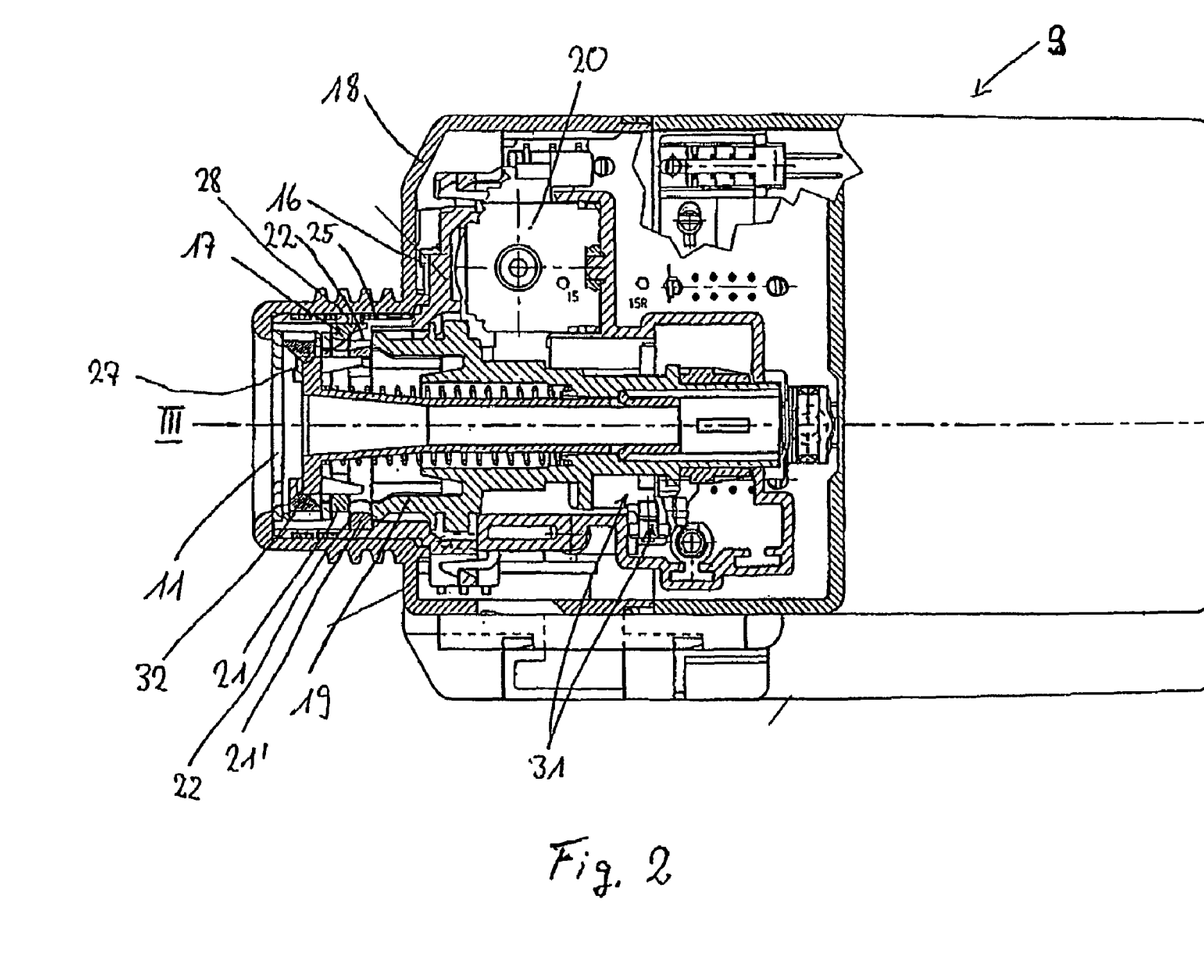
FIG. 2 shows a longitudinal section through the lock from FIG. 1.

In order to increase the security against unauthorized starting up of the operating unit 13, a mechanical blocking element 17 is arranged in the lock 3, as is revealed in greater detail in FIG. 2. The blocking element 17 executes an adjusting movement on introduction of the key 2 into the holder 11 and/or on removal of the key 2 from the holder 11. In the process, the blocking element 17 interacts with the holder 11 in such a manner that in addition to the release triggered by the operating signal 9 the movement of the holder 11 is made possible only when the key 2 is correctly in the holder 11. A further, additional transmitting means 25 for the adjusting movement of the blocking element 17, which transmitting means is formed separately with regard to the blocking element 17, can be brought into operative connection with the blocking element 17 at one end and with the switching element 16 at the other end. This causes the adjusting movement of the blocking element 17 to exert a switching action on the switching element 16 via the transmitting means 25. In particular, on introduction of the key 2 into the holder 11 the switching element 16 is switched on and emits the "key inserted" signal. On removal of the key 2 from the holder 11 the switching element 16 is switched off, rendering the "key inserted" signal inapplicable.

In addition, the key 2 can be used for the activation of further functions, as is apparent with reference to FIG. 1. The electronic key 2 can be used to remotely activate the locking system 1 in order to authorize access; in the present case, the car doors 4 of the motor vehicle can be remotely locked and unlocked up to a certain maximum distance from the motor vehicle.

For the activation of these further functions a coded operating signal 8 can be transmitted between the key 2 and a receiving and transmitting device 10 for the locking system 1, which device is arranged centrally in the motor vehicle, for example on the inside mirror 7. Electromagnetic signals, such as high frequency signals and/or infrared signals or the like are generally used as the operating signal 8 for the key 2. The transmission of the operating signal 8 can be triggered by the user by means of actuating members 14 located on the housing of the key 2. The transmitted operating signal 8 is supplied to a signal-processing device 6 located in the motor vehicle, and after positive evaluation of the operating signal 8, i.e. if the key 2 is an authorized one, a control device 5, which is located for example in the respective car door 4 and is connected to the signal-processing device 6 via the bus system 12, is actuated in order to lock or unlock the car doors 4. The control device 5 may, for example, be a central locking arrangement which is known per se.

Figure 3:
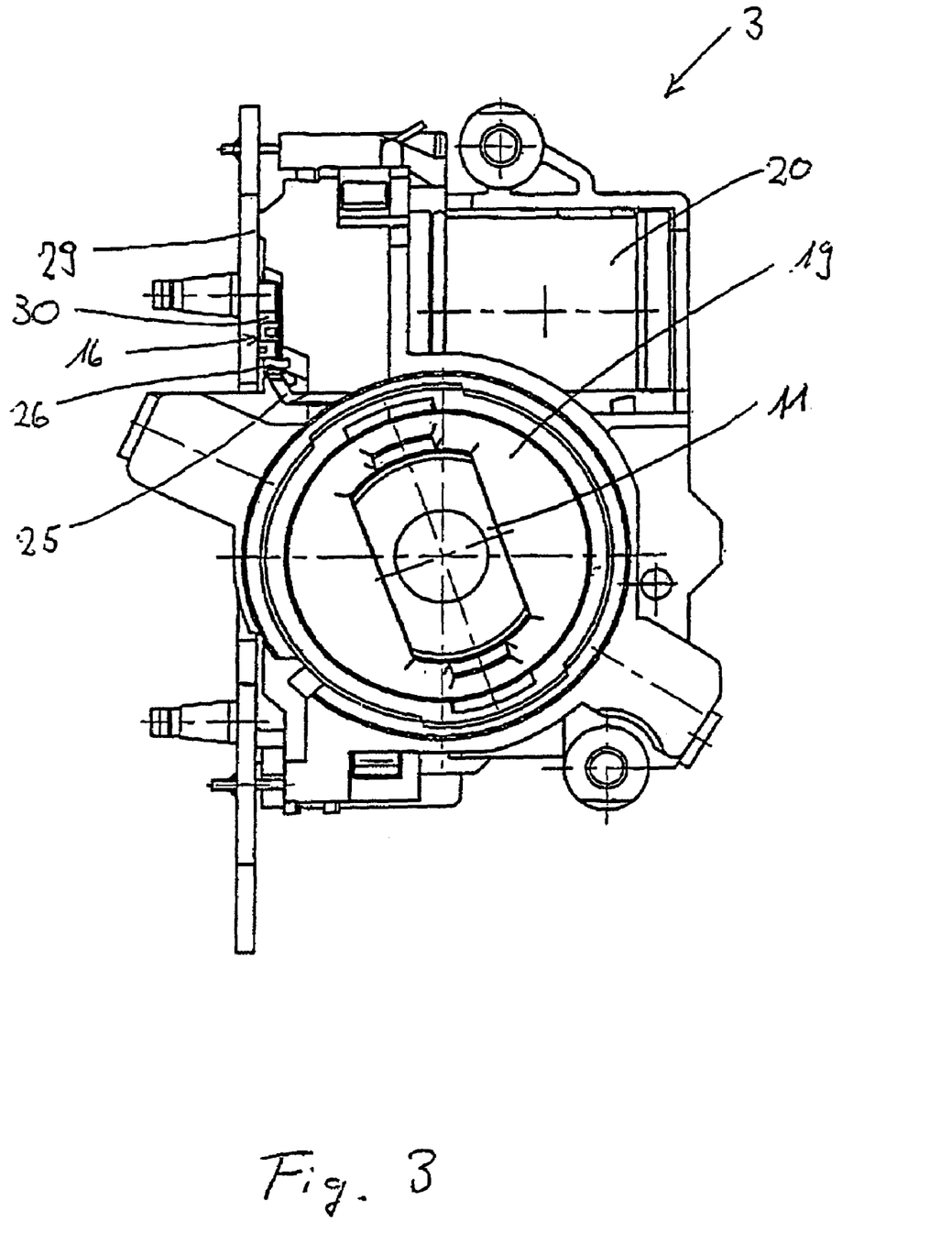
FIG. 3 shows the lock in an enlarged illustration viewed from the direction III in FIG. 2, in which parts of the housing for the lock have been omitted for the sake of clarity.

The more detailed refinement of the electronic lock 3, which is shown merely schematically in FIG. 1, as an electronic ignition lock for a motor vehicle can be seen in various developments of the invention in FIGS. 2 and 3.

The lock 3 has a housing 18 which is attached, for example, to the dashboard of the motor vehicle. The holder 11, which is located on the front part of the housing 18, is accessible to the user for introducing the key 2. The key 2, which is in the holder 11, is in direct operative connection with a rotor 19, as can also be gathered from FIG. 6, the blocking element 17 being mounted movably on and/or in the rotor 19. A rotary catch 20, which is designed in the manner of an electromagnetic catch, can be bought into or out of interaction with the rotor 19, as a result of which the blocking or release of the lock 3 can be brought about. The released rotor 19 interacts, on rotation into the actuating position, with further switching elements 31, which are situated in the immediate vicinity of the rotor 19 and indicated merely schematically, for example via a cam controlling means. The switching elements 31 are used as a type of load-break switch for the connection of various electric circuits in the motor vehicle. Instead of an element which can be moved rotationally, the holder 11 may also be designed as an element which can be moved translationally, but this is not shown in more detail in the drawings.

In the region of the holder 11 an additional locking slide 32 may be located in the housing 18. In the actuating position of the holder 11 the locking slide 32 is in operative connection with the electronic key 2 in such a manner that removal of the key 2 from the holder 11 is prevented. In order to be able to take the key 2 out of the holder 11, the rotor 19 has first of all to be turned back into the starting position in order to take the operating unit 13 out of operation.

A printed circuit board 29 for the electric and/or electronic components of the lock 3 is located at a distance from the holder 11 in the housing 18 of the lock 3, as is shown in FIG. 3. Provision is made to fasten the switching element 16 on the printed circuit board 29, the distance to the printed circuit board 29 being bridged by the transmitting element 25. The switching element 16 comprises an electric switch, to be precise in the present case comprises a push-button switch designed in the manner of a break contact element. Furthermore, the switching element 16 is provided with a fully enclosed housing 30. The switching element 16 is preferably designed in the manner of an SMD (surface mounted device) component, with the result that the switching element 16 can be fastened by its connections on the printed circuit board 29 using SMD technology.

As is revealed in greater detail in FIG. 2, the blocking element 17 can be designed in the manner of a mechanical blocking slide 21 which is mounted movably on the holder 11. If appropriate, the blocking slide 21 may also be mounted movably in the immediate vicinity of the holder 11. In order to increase the security a further blocking slide 21' may be arranged on the holder 11 in a mirror-inverted manner with respect to the blocking slide 21, with the result that the blocking element 18 comprises an opposed pair of slides 21, 21'. By means of the key 2, the blocking slide 21, 21' can be brought into or out of operative connection with a groove 22 in the housing 18 of the lock 3 for additional blocking or release of the movement of the holder 11. The blocking slide 21 or the pair of slides 21, 21' is expediently subjected to an elastic force, which can be produced by a spring (not shown in greater detail), in the direction of the groove 22 in the housing 18 of the lock 3. This force causes, on the one hand, the blocking slide 21, 21' to protrude into the groove 22 when the key 2 is not correctly in the holder 11. On the other hand, when the key 2 is correctly in the holder 11 the blocking slide 21, 21' is secured outside the groove 22 counter to the force by the key 2. For this purpose, an extension 24 on the housing 23 of the key 2 acts on the blocking slide 21, 21' so as to bring about its adjusting movement and for its securing, which is revealed in greater detail in FIGS. 4 and 6.

The transmitting means 25 which is located between the blocking element 17 and the switching element 16 and is used for transmitting the adjusting movement of the blocking element 17 to the switching element 16 can be seen in more refined details in FIGS. 4 to 7.

Figure 7:
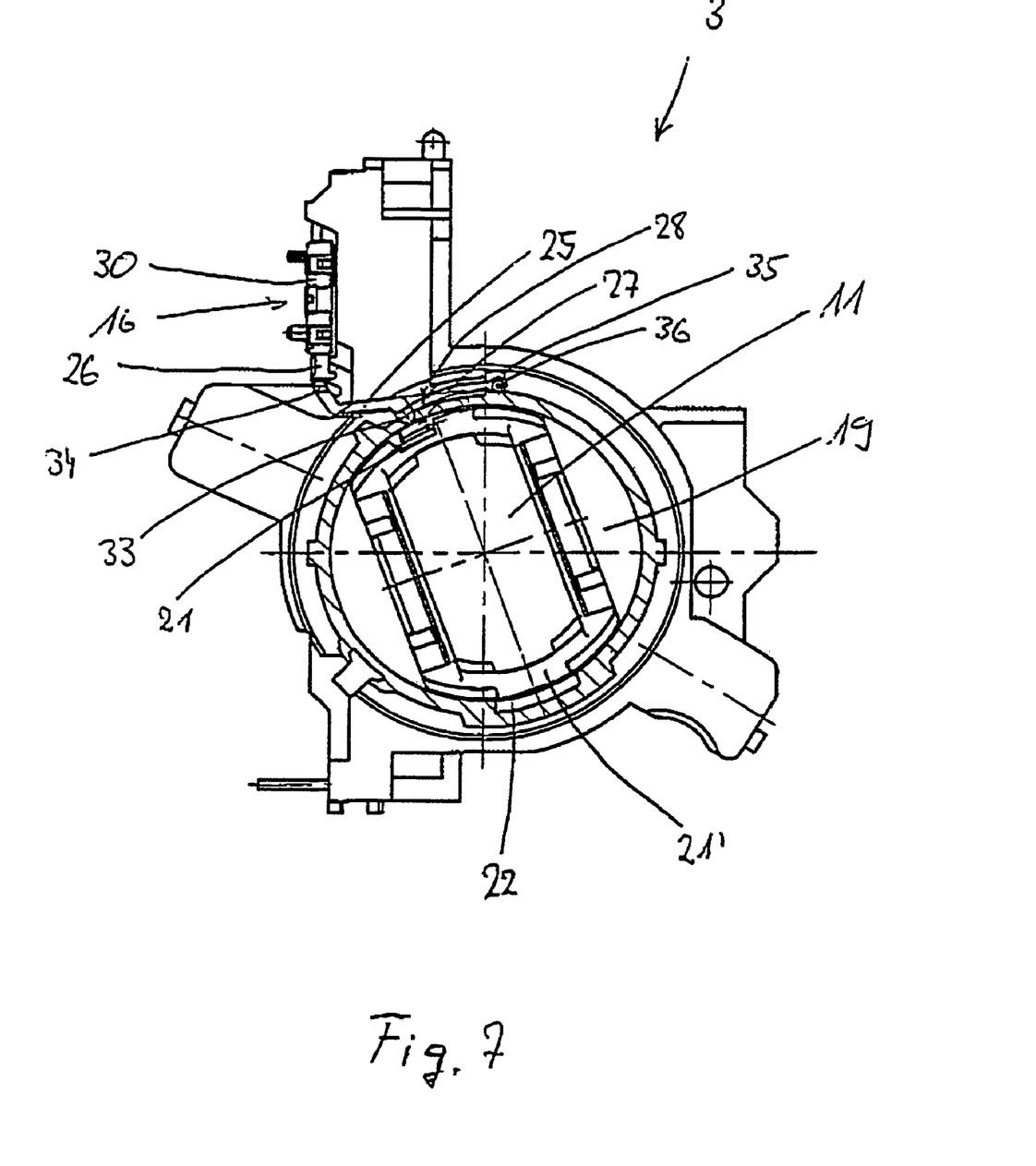
FIG. 7 shows a section as in FIG. 5, in which the key is in the holder.
Figure 8:
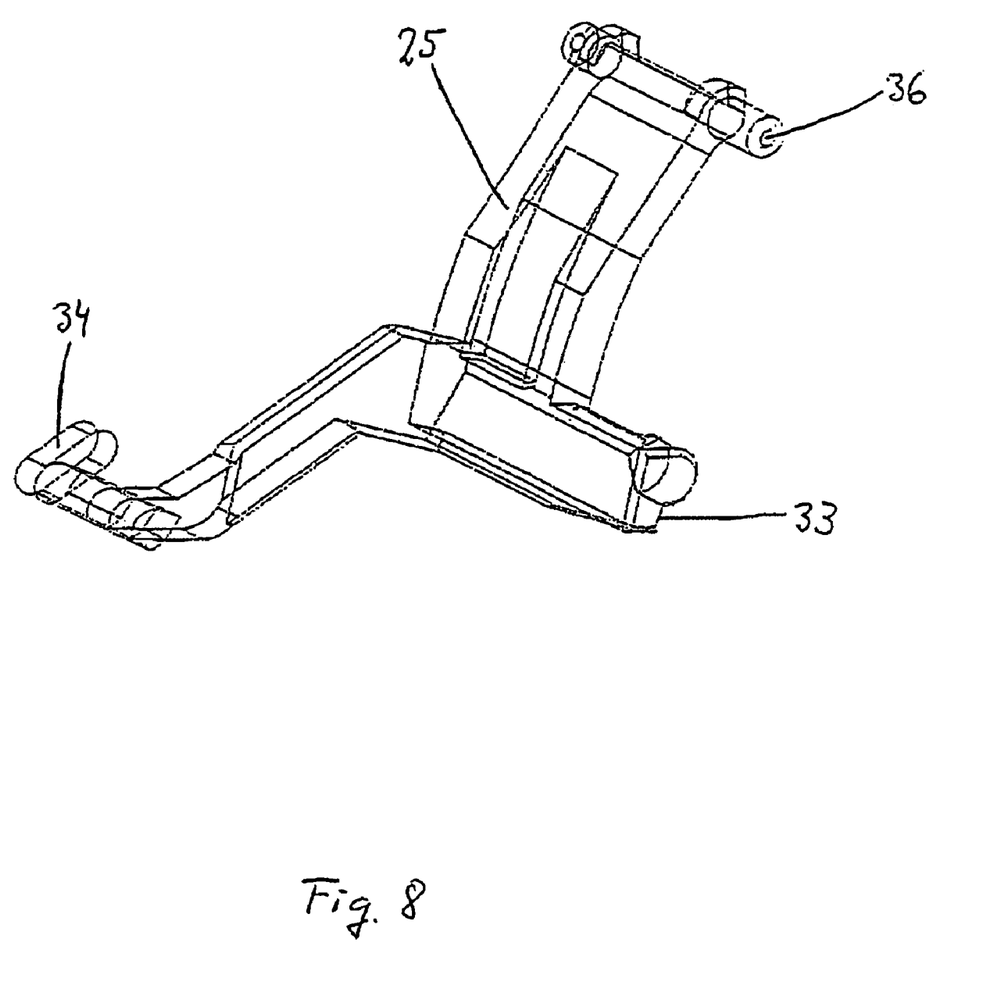
FIG. 8 shows a component part of the lock in a perspective illustration.

In a preferred refinement, the transmitting means 25 comprises a lever which is arranged between the blocking element 17 and the switching element 16 and is shown in FIG. 8 as a component part in a perspective view. The blocking element 17 acts on one end 33 of the lever 25, with the result that the lever 25 can be moved by the adjusting movement of the blocking element 17. The other end 34 of the lever 25 acts, for its part, on the actuating member 26 of the switching element 16, with the result that during the adjusting movement of the blocking element 17 the lever 25 moves the actuating member 26 in order to exert a switching action on the switching element 16 and/or releases it. The lever 25 is mounted in the lock 3 in a rotatable manner on a bearing 35 by means of a spindle 36 independently of the holder 11, which can be seen with reference to FIG. 5 or 7.

Figure 5:
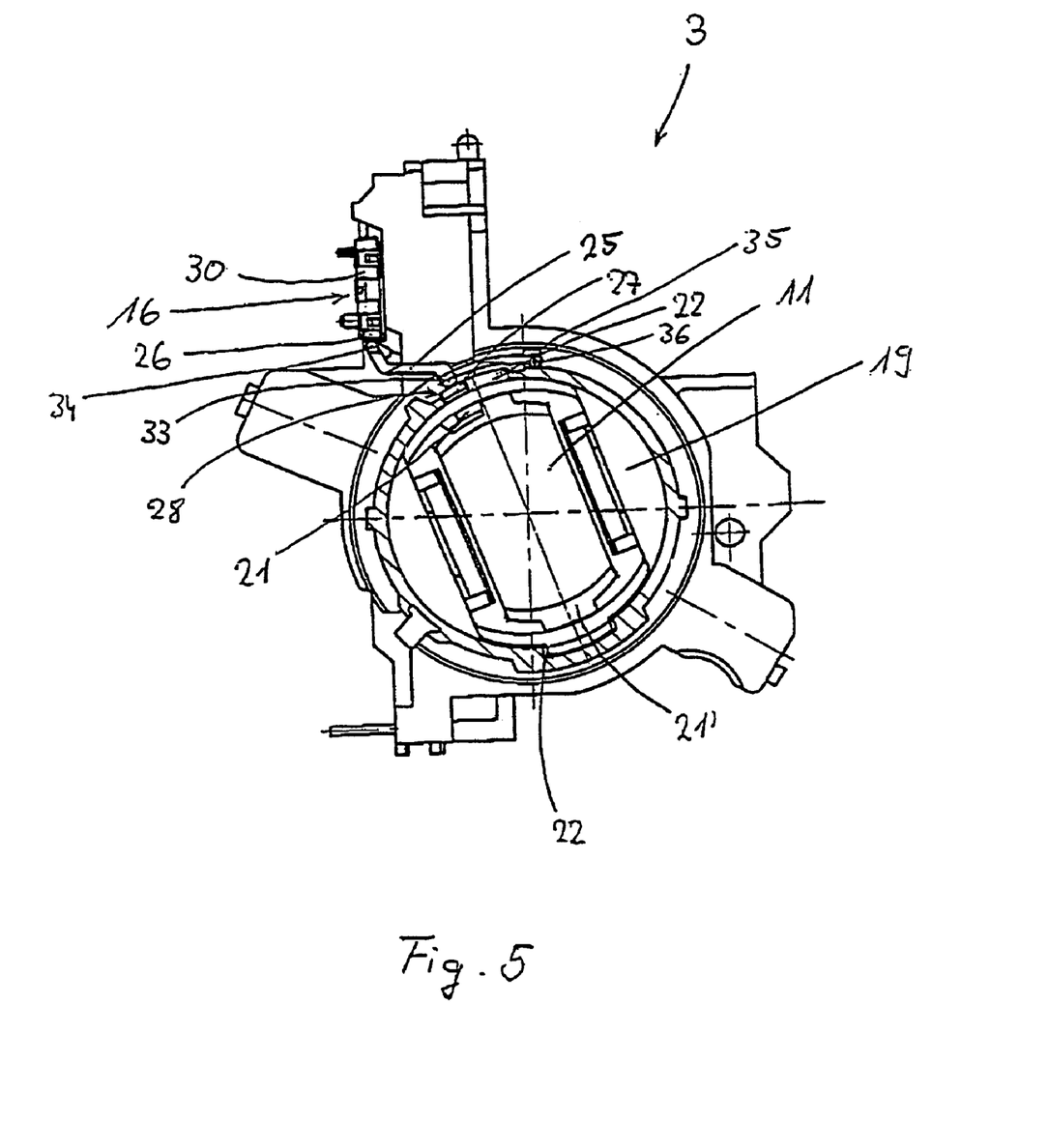
FIG. 5 shows a section along the line 5—5 in FIG. 4, in which the key is not in the holder.

As is further revealed in FIGS. 5 and 7, a cam 27 is located on the blocking slide 21, in particular on one of the two blocking slides of the pair of slides 21, 21', the cam 27 acting on one end 33 of the lever 25. The groove 22 within the housing 18 in the lock 3 is configured in the region of the cam 27 as an opening 28, with the result that one end 33 of the lever 25 protrudes into the groove 22 on that side of the groove 22 which lies opposite the blocking slide 21.

Figure 4:
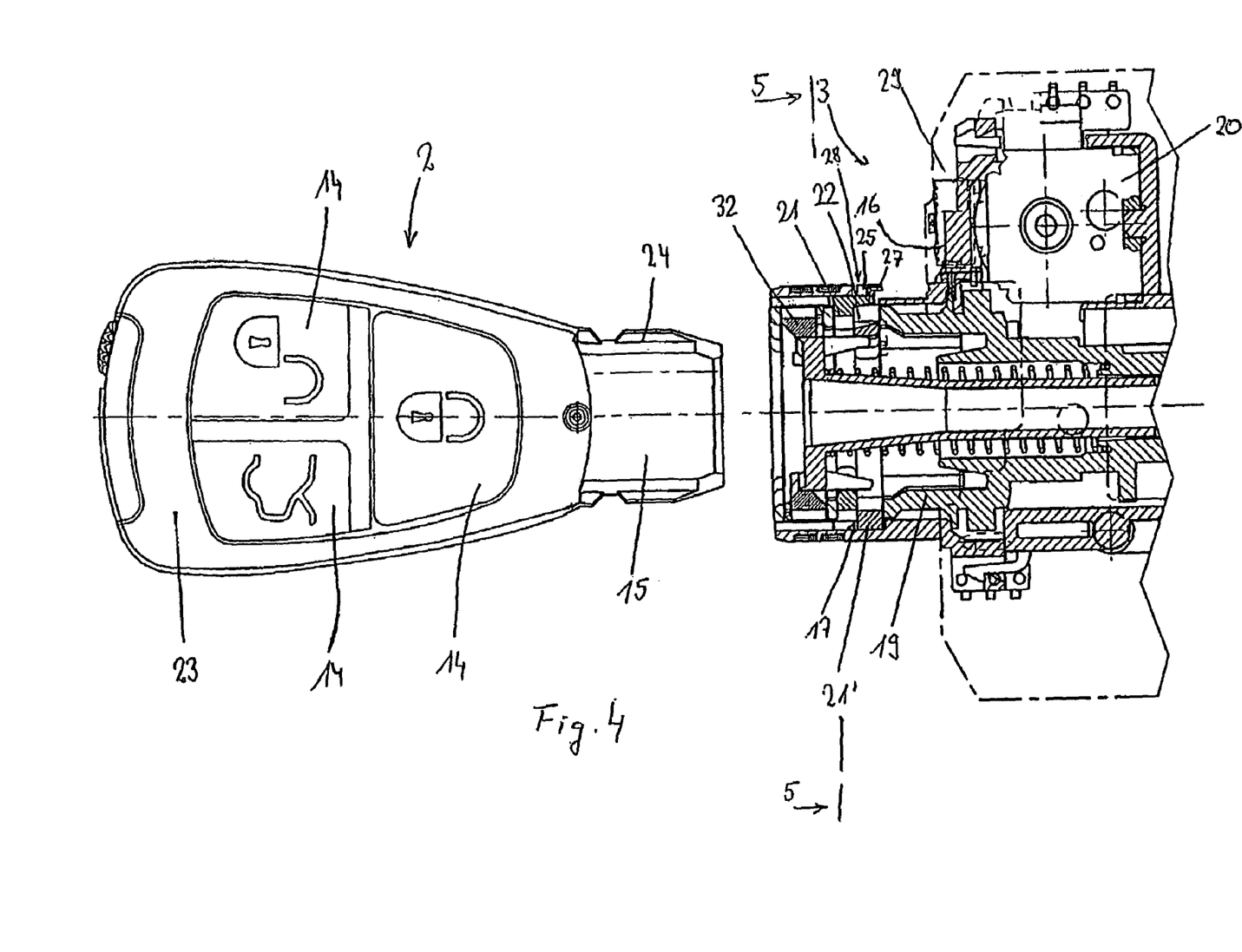
FIG. 4 shows the region of the holder of the lock as in FIG. 2, in which the key is not in the holder.
Figure 6:
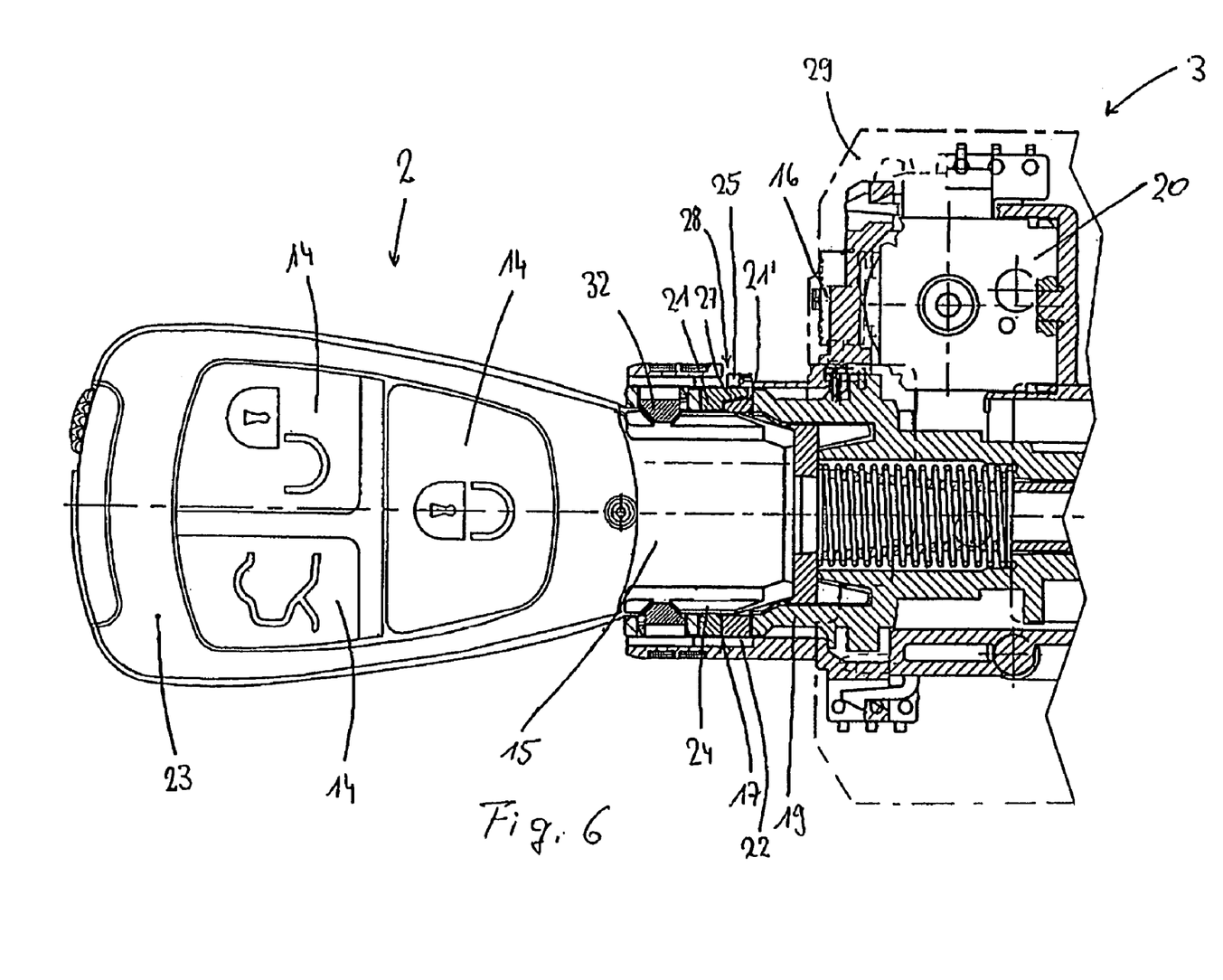
FIG. 6 shows the region of the holder of the lock as in FIG. 2, in which the key is in the holder.

In FIGS. 4 and 5, the position of the lever 25 can be seen in which the key 2 is not in the holder 11 of the lock 3. In this position, the actuating member 26 of the switching element 16 is actuated and secured by the end 34 of the lever 25. The contact system of the switching element 16 which is designed as a break contact element is therefore opened, with the result that the switching element 16 does not therefore emit a "key inserted" signal. In FIGS. 6 and 7, the other position of the lever 25 can be seen, in which the key 2 is correctly in the holder 11 of the lock 3. Here, the actuating member 26 of the switching element 16 is now released by the end 34 of the lever 25 and is therefore unactuated. The contact system of the switching element 16 which is designed as a break contact element is therefore closed, with the result that the switching element 16 emits the "key inserted" signal.

The invention is not restricted to the exemplary embodiment described and illustrated. Rather, it also encompasses all expert developments within the scope of the concept of the invention. The invention may thus not only be used on ignition locks or the like for motor vehicles, but may also be used on electronic locks of other locking systems, for example on doors in buildings etc.

What is claimed is:

1. An electronic lock for a locking system, in particular electronic ignition lock for a motor vehicle, comprising:
 a holder into which an associated electronic key can be introduced, and having a switching element which can be actuated by introduction of the key into the holder and that produces a key inserted signal in the process, the key, which when in the holder, exchanges at least one coded operating signal with the lock, with the result that after positive evaluation of the operating signal the release of the lock for movement of the holder by means of the key into at least one actuating position can be triggered, wherein a blocking element, which executes an adjusting movement on introduction of the key into the holder or removal of the key from the holder, interacts with the holder in such a manner that the movement of the holder additionally to its release is made possible only when the key is correctly in the holder, wherein a separate transmitting means for the adjusting movement of the blocking element can be brought into operative connection with the blocking element at one end and with the switching element at the other end, and wherein the adjusting movement of the blocking element causes the transmitting means to exert a switching action on the switching element.

2. The electronic lock as claimed in claim 1, wherein the blocking element is designed in the manner of a mechanical blocking slide, wherein the blocking slide is mounted movably on the holder or in the immediate vicinity of the holder, and wherein furthermore the blocking slide can be brought by means of the key into or out of operative connection with a groove in the housing of the lock for additional blocking or release of the movement of the holder.

3. The electronic lock as claimed in claim 1, wherein the blocking element is subjected to a force, in particular a spring force, in the direction of a groove in the housing of the lock in such a manner that when the key is outside the holder or when it is not correctly in the holder, the blocking element protrudes into the groove, and wherein when the key is correctly in the holder the blocking element is secured outside the groove by the key.

4. The electronic lock as claimed in claim 1, wherein an extension on the housing of the key acts on the blocking element so as to bring about its adjusting movement or for its securing.

5. The electronic lock as claimed in claim 1, wherein the transmitting means comprises a lever which is arranged between the blocking element and the switching element, the blocking element acting on one end of the lever, with the result that the lever can be moved by the adjusting movement of the blocking element, and wherein the other end of the lever acts on the actuating member of the switching element, with the result that during the adjusting movement of the blocking element the lever moves the actuating member in order to exert a switching action on the switching element.

6. The electronic lock as claimed in claim 1, wherein the blocking element is designed as a spring-loaded, opposed pair of slides, wherein a cam on the blocking slide, in particular on one blocking slide of the pair of slides, acts on one end of a lever which is arranged between the blocking element and switching element, and wherein furthermore a groove within the housing in the lock is configured in the region of the cam as an opening, with the result that one end of the lever protrudes into the groove on that side of the groove which lies opposite the blocking element.

7. The electronic lock as claimed in claim 1, wherein the switching element comprises an electric switch, in particular a push-button switch designed in the manner of a break contact element, wherein the switching element is provided with a fully enclosed housing, and wherein furthermore the switching element is fastened on a printed circuit board arranged at a distance from the holder, the switching element in particular being designed in the manner of an SMD (surface mounted device) component, with the result that the switching element can be fastened by its connections on the printed circuit board using SMD technology.

8. The electronic lock as claimed in claim 1, wherein the holder is designed as an element which can be moved rotationally or translationally by means of the key, in particular as a rotatable rotor, it being possible for a rotary catch to be brought into and out of interaction with the rotor in order to block or release the rotor, wherein the released rotor, on rotation into the actuating position, interacts with further switching elements, which are in the immediate vicinity of the rotor, in the manner of a load-break switch, via a cam controlling means, and wherein furthermore the blocking element is mounted movably on or in the rotor.

9. The electronic lock as claimed in claim 1, wherein in the actuating position of the holder an additional blocking slide is in operative connection with the electronic key in such a manner that removal of the key from the holder is prevented.

* * * * *